T. A. WYLIE.
ATTACHMENT FOR CULTIVATORS.
APPLICATION FILED JUNE 15, 1909.

932,741.

Patented Aug. 31, 1909.
2 SHEETS—SHEET 1.

Witnesses
H. O. Van Antwerp
Georgiana Chace

Inventor
Thomas A. Wylie
By Luther V. Moulton
Attorney

T. A. WYLIE.
ATTACHMENT FOR CULTIVATORS.
APPLICATION FILED JUNE 15, 1909.

932,741.

Patented Aug. 31, 1909.
2 SHEETS—SHEET 2.

Witnesses
H. O. Van Antwerp
Georgiana Chace

Inventor
THOMAS A. WYLIE
BY Luther V. Moulton
Attorney

UNITED STATES PATENT OFFICE.

THOMAS A. WYLIE, OF CHAFFEE, MISSOURI.

ATTACHMENT FOR CULTIVATORS.

932,741.  Specification of Letters Patent.  Patented Aug. 31, 1909.

Application filed June 15, 1909.  Serial No. 502,281.

*To all whom it may concern:*

Be it known that I, THOMAS A. WYLIE, a citizen of the United States of America, residing at Chaffee, in the county of Scott and State of Missouri, have invented certain new and useful Improvements in Attachments for Cultivators; and I do hereby declare the following to be a full, clear, and exact description of the invention, such as will enable others skilled in the art to which it appertains to make and use the same.

My invention relates to improvements in attachments for cultivators, and more particularly to such attachments for cultivators whereby grain, seeds or other material may be sown broadcast in advance of the cultivator, as occasion may arise; and to provide the device with various new and useful features, hereinafter more fully described and particularly pointed out in the claims.

Figure 1:
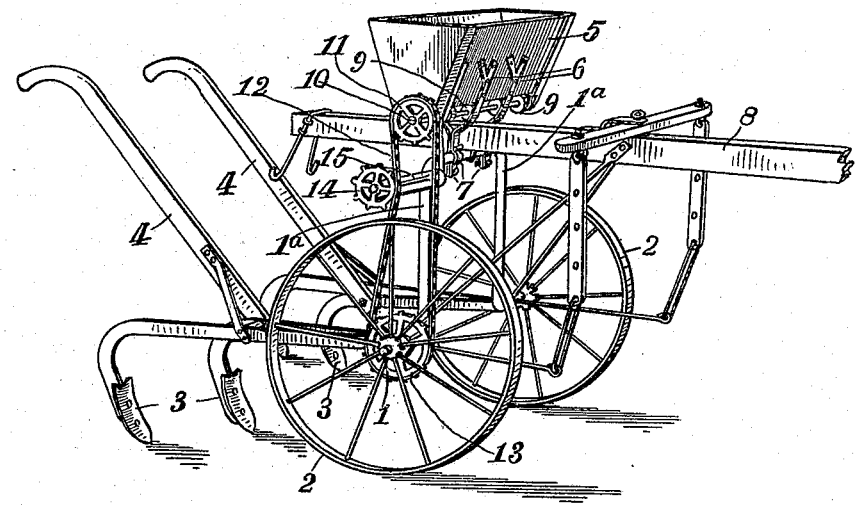
Figure 2:
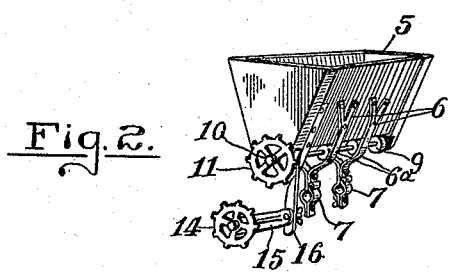
Figure 3:
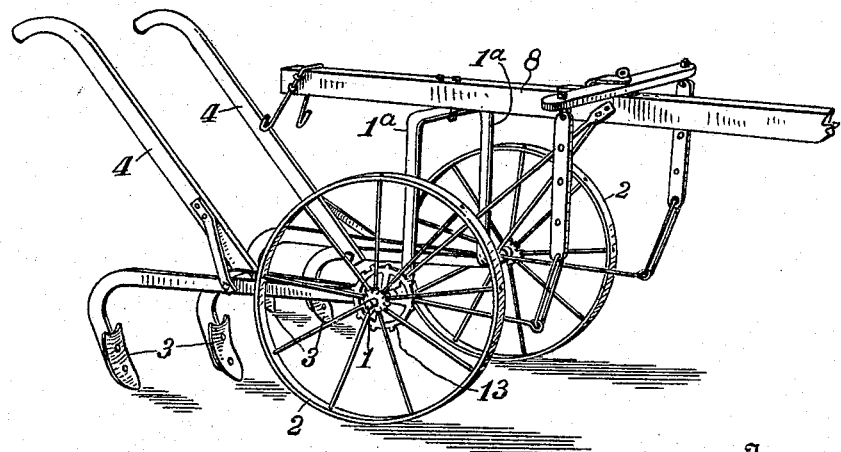
Figure 4:
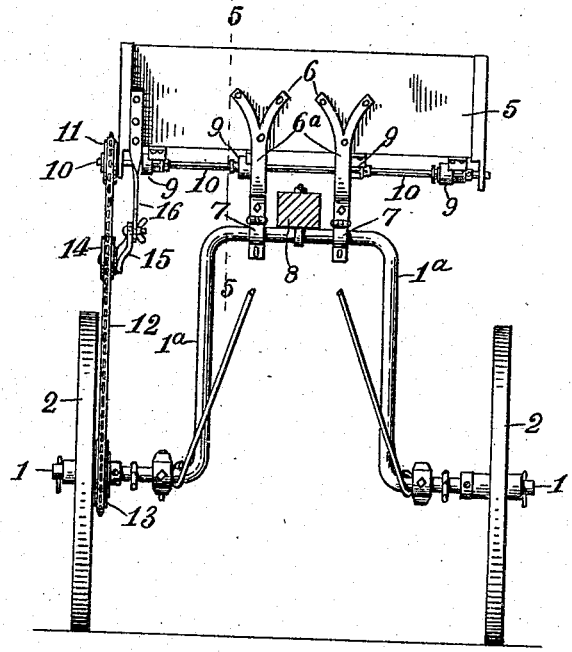
Figure 5:
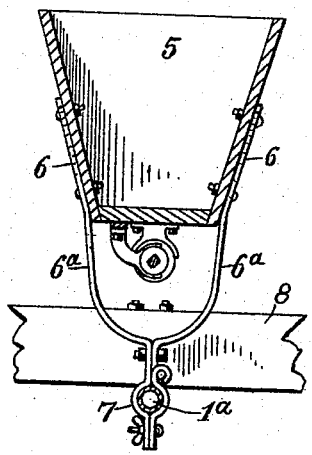
Figure 6:
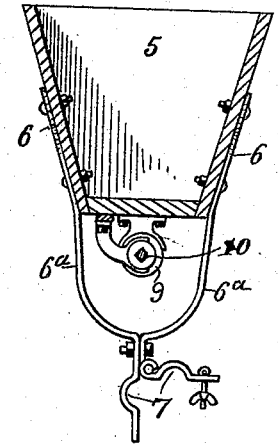

My invention consists essentially of a device, substantially as shown, which is adapted to be attached to an ordinary straddle-row cultivator at pleasure, whereby seeds or other material can be sown in advance of the cultivator when the device is used, or which may be detached, leaving the cultivator unincumbered for use as a cultivator only, as will more fully appear by reference to the accompanying drawings, in which:

Figure 1 is a perspective of a cultivator having my device attached thereto and adjusted for use; Fig. 2 is my seed feeding device all except the driving sprocket and chain, shown detached from the cultivator; Fig. 3 is a cultivator to which my device is adapted to be attached at pleasure; Fig. 4 a front elevation of a part of the cultivator with my device attached thereto and shown on an enlarged scale; Fig. 5 a vertical sectional detail on the line 5—5 of Fig. 4; and, Fig. 6 the same of the attachment removed from the cultivator.

Like numbers refer to like parts in all of the figures.

1 represents the axle of the cultivator, having its middle portion extended upward and bent twice at right angles forming a U-shaped middle portion, as at $1^a$; 2, wheels journaled on the respective ends of the axle to support the device; 3 cultivator beams pivotally attached to the axles near the wheels and having suitable handles 4 for operating the same; and 8 is the beam of the cultivator all as usually made in that class known as straddle-row cultivators.

5 is a hopper to contain the materials to be sown broadcast ahead of the cultivator plows.

6 are brackets attached to the hopper and extending downward and inward beneath the same as at $6^a$ to extend below the feeding mechanism for distributing the grain or other material. These brackets are joined in pairs near their lower ends and are provided with detachable clips or clamps 7 adapted to be securely attached to the elevated part of the axle, and support the hopper thereon.

9 are feed cups such as are commonly used to distribute grain or other like material communicating with the hopper, which cups are mounted on a shaft 10 and operated thereby, the shaft being provided with a sprocket wheel 11 at its outer end engaged by a chain 12 extending downward therefrom and engaging a driving sprocket 13 fixed on the hub of one of the wheels 2.

14 is a tightener and 15 an arm carrying the tightener, said arm being adjustably supported by the bracket 16 attached to the hopper 5.

All of my device is readily applied to or removed from a straddle-row cultivator, such as shown, whereby the cultivator may be readily adapted for use therewith, or used without my attachment at pleasure, which is obviously of practical advantage.

What I claim is:

1. A seed feeding attachment for straddle-row cultivators, comprising a hopper having attached seed feeding mechanism extending below the same, brackets attached to the hopper and embracing the said mechanism, said brackets being joined below said mechanism and provided with detachable clips to embrace the middle part of the axle of a cultivator, and detachable means for transmitting motion to the feeding mechanism from a wheel of a cultivator.

2. The combination of a cultivator having an axle provided with an upwardly bent middle portion, wheels journaled on the axle, a pole above the middle of the axle and attached thereto, a hopper having seed feeding mechanism beneath the same and a sprocket wheel at one end to operate said mechanism, brackets attached to the hopper and extending at each side of the said mechanism and below the same, said brackets being joined at their lower ends and provided with clips to engage the axle and hold the hopper elevated above the pole, a sprocket-wheel attached to one of the wheels of the cultivator, and a sprocket chain detachably connecting the sprocket wheels.

3. In combination with a cultivator having an axle and supporting wheels journaled on the same, a seed feeding attachment comprising a hopper, sowing mechanism attached to the hopper, a sprocket wheel attached to said mechanism to operate the same, brackets attached to the hopper and extending below the seed feeding mechanism, clips on the lower ends of the brackets adapted to engage the axle and hold the hopper elevated above the same, a tightener mounted on the hopper to engage the chain, a sprocket wheel attached to a wheel of the cultivator, and a chain connecting said sprocket wheels and engaged by the tightener.

In testimony whereof I affix my signature in presence of two witnesses.

THOMAS A. WYLIE.

Witnesses:
J. W. HELB,
J. C. GREEN.